(12) United States Patent
Hega et al.

(10) Patent No.: US 12,186,696 B2
(45) Date of Patent: Jan. 7, 2025

(54) MODULAR FILTER ELEMENT

(71) Applicant: MADISON FILTER 981 LIMITED, Stoke-on-Trent (GB)

(72) Inventors: Detlef Hega, Bad Gandersheim (DE); Ian Chisem, Warrington Cheshire (GB); Purv Purohit, Berlin (DE)

(73) Assignee: MADISON FILTER 981 LIMITED, Stoke-on-Trent (GB)

( * ) Notice: Subject to any disclaimer, the term of this patent is extended or adjusted under 35 U.S.C. 154(b) by 902 days.

(21) Appl. No.: 17/254,141

(22) PCT Filed: Jun. 18, 2019

(86) PCT No.: PCT/GB2019/051706
§ 371 (c)(1),
(2) Date: Dec. 18, 2020

(87) PCT Pub. No.: WO2019/243807
PCT Pub. Date: Dec. 26, 2019

(65) Prior Publication Data
US 2021/0245085 A1  Aug. 12, 2021

(30) Foreign Application Priority Data
Jun. 19, 2018 (GB) ..................................... 1810051

(51) Int. Cl.
*B01D 46/24* (2006.01)
*B01D 46/00* (2022.01)

(52) U.S. Cl.
CPC ..... *B01D 46/2407* (2013.01); *B01D 46/0001* (2013.01); *B01D 46/0013* (2013.01);
(Continued)

(58) Field of Classification Search
None
See application file for complete search history.

(56) References Cited

U.S. PATENT DOCUMENTS 3,710,552 A * 1/1973 Genton ................. B01D 46/76
 55/300
3,747,307 A * 7/1973 Peshina ................. B01D 46/06
 55/379

(Continued)

FOREIGN PATENT DOCUMENTS

DE      7712533      5/1978
DE   102012107097   5/2014
(Continued)

OTHER PUBLICATIONS

Foriegn references provided as NPL.*
International Search Report for International PCT Application No. PCT/GB2019/051706, dated Oct. 12, 2019, 5 pages.

*Primary Examiner* — Brit E. Anbacht
(74) *Attorney, Agent, or Firm* — Day Pitney LLP; George Chaclas; Anthony A. Kassas

(57) ABSTRACT

The present invention relates to a modular filter element comprising a first elongate hollow body, a second elongate hollow body and connection means for connecting the first elongate hollow body to the second elongate hollow body, wherein the connection means comprises a connection member that extends into a lower wall of the first elongate hollow body and into the upper wall of the second elongate hollow body to provide a gas-tight seal between the first elongate hollow body and the second elongate hollow body.

20 Claims, 5 Drawing Sheets

(52) U.S. Cl.
CPC .... *B01D 2265/029* (2013.01); *B01D 2265/04* (2013.01); *B01D 2265/06* (2013.01)

(56) References Cited

U.S. PATENT DOCUMENTS

| | | | | |
|---|---|---|---|---|
| 3,859,065 | A * | 1/1975 | Schoeck | B01D 46/06 55/378 |
| 3,938,971 | A * | 2/1976 | McClure | B01D 46/76 55/300 |
| 4,141,128 | A * | 2/1979 | Wonderling | B23P 15/00 55/379 |
| 5,173,098 | A * | 12/1992 | Pipkorn | B01D 46/06 55/379 |
| 6,361,575 | B1 * | 3/2002 | Alvin | B01D 46/2407 55/482 |
| 6,626,970 | B2 * | 9/2003 | Pipkorn | B01D 46/06 55/377 |
| 8,956,435 | B2 * | 2/2015 | Appelo | B01D 29/15 55/378 |
| 9,962,641 | B2 * | 5/2018 | Van Den Bossche | B01D 46/4227 |
| 2004/0103626 | A1 * | 6/2004 | Warth | B01D 46/60 55/467 |
| 2005/0183404 | A1 * | 8/2005 | Pipkorn | B01D 46/06 55/379 |
| 2012/0124950 | A1 * | 5/2012 | Sessions | B01D 46/60 55/482 |
| 2012/0279185 | A1 * | 11/2012 | Appelo | B01D 29/15 414/800 |
| 2013/0014479 | A1 * | 1/2013 | Mann | B01D 46/2411 29/428 |
| 2014/0151282 | A1 * | 6/2014 | Brown | B01D 29/52 210/232 |
| 2014/0208704 | A1 * | 7/2014 | Hill | B01D 46/56 55/483 |
| 2017/0173512 | A1 * | 6/2017 | Van Den Bossche | B01D 46/0005 |
| 2017/0312675 | A1 * | 11/2017 | Grothues | B01D 46/2407 |

FOREIGN PATENT DOCUMENTS

| | | | |
|---|---|---|---|
| DE | 102014011678 | | 2/2016 |
| EP | 0730896 | | 11/1996 |
| EP | 2684592 | | 1/2014 |
| FR | 888429 | A | 12/1943 |
| JP | 2016107200 | A | 6/2016 |
| KR | 20150037186 | | 4/2015 |
| WO | WO-0216007 | A2 * | 2/2002 ......... B01D 46/0004 |
| WO | WO-2022212527 | A2 * | 10/2022 |

* cited by examiner

MODULAR FILTER ELEMENT

CROSS-REFERENCE TO RELATED APPLICATIONS

This application is the U.S. national phase entry under 35 U.S.C. § 371 of International Application No. PCT/GB2019/051706, filed Jun. 18, 2019, entitled MODULAR FILTER ELEMENT, which in turn claims priority to and benefit of Great Britain Application No. 1810051.1, filed Jun. 19, 2018 of which each is incorporated hereby by reference in their entirety for all purposes.

TECHNICAL FIELD OF THE INVENTION

The present invention relates to a modular filter element, to a method of producing a modular filter element, to a support structure for use in a modular filter element and to the use of the modular filter element in a filtration plant.

BACKGROUND TO THE INVENTION

Hot gas filtration is a process by which particulate matter is filtered from gas streams that typically have a temperature between 200° C. and 900° C. Ceramic filter elements are often used instead of traditional textile filter elements to remove particulates from hot gas streams since they exhibit superior filtration characteristics and do not substantially degrade at higher temperatures. Most commercially available single piece ceramic filter elements are available in lengths of up to 4.5 metres. However, it becomes increasingly difficult to manufacture, store, transport, handle and to fit the filter elements to filter housings when the length of the filter element exceeds 3 metres, and in applications where thousands of filter elements may be needed, the filter plant footprint and its cost also becomes prohibitive.

Modular filter elements formed from multiple filter element sub-sections are known in the art and were developed to overcome or at least alleviate some of the above-mentioned problems. One known modular filter element utilises a screw connection to join adjacent filter element sub-sections together. However, such filter elements suffer from the disadvantage that they are expensive to manufacture due to the machining involved in forming the screw threads, e.g., it is particularly difficult to machine the screw threads without forming cracks during the machining operation. Moreover, due to the nature of the connection, such modular filter elements suffer from sealing issues which can lead to a reduction in filtration performance. Filter elements are also known to vibrate in use and therefore there is a risk of the filter element sub-sections becoming partly or fully unscrewed. It will be appreciated that if filter element sub-sections become partly unscrewed then filtration performance will decline due to the absence of a gas tight seal. However, in more severe cases where the filter element sub-sections become fully unscrewed, the filter element sub-section below the joint may fall into a collection hopper thereby contaminating any filtered particulate matter in the hopper. Contamination of the particulate matter is undesirable, especially when the filtered particulate matter is valuable, and may result in it having to be discarded and/or the filtering operation being halted while the filter element sub-section is removed from the hopper.

In light of the above it is an object of embodiments of the invention to provide a modular filter element that is more than 3 metres in length.

It is also an object of embodiments of the invention to provide a modular filter element that exhibits improved sealing performance at the interface between two filter element sub-sections.

It is a further object of embodiments of the invention to provide a modular filter element that enables a secure connection between two filter element sub-sections to be obtained.

SUMMARY OF THE INVENTION

According to a first aspect of the invention there is provided a modular filter element comprising a first elongate hollow body, a second elongate hollow body and connection means for connecting the first elongate hollow body to the second elongate hollow body, wherein the connection means comprises a connection member that extends into a lower wall of the first elongate hollow body and into the upper wall of the second elongate hollow body to provide a gas-tight seal between the first elongate hollow body and the second elongate hollow body.

The filter element may be formed from a ceramic material, a ceramic based material or from mineral fibres. In some embodiments the filter element may comprise a catalyst. The catalyst may be any catalyst that is capable of removing gaseous contaminants from a gas stream. In particular, the catalyst may enable acid gases, NOx and dioxins to be simultaneously removed from a gas stream by selective catalytic reduction.

The connection member may be capable of withstanding operating temperatures of at least 250° C. so that it does not substantially thermally degrade in use, e.g., when the filter element is being used to filter particulate matter from hot gas streams. In some embodiments the connection member may be capable of withstanding temperatures of at least 500° C. The connection member may comprise a metal or metal alloy such as steel. Alternatively, the connection member may be formed from a polymeric material.

The filter element may comprise an adhesive located at the interface between the first elongate hollow body and the second elongate hollow body. The adhesive may be a ceramic cement adhesive, e.g. when the filter element is formed from a ceramic material. The adhesive may be present in a recess formed in the lower wall of the first elongate hollow body and/or in a recess formed in the upper wall of the second elongate hollow body. The recesses formed in the upper and lower walls may be configured to receive the connection member. The presence of the adhesive at the interface and/or in the recesses reinforces the connection member and contributes to strengthening the connection between the first elongate hollow body and the second elongate hollow body.

The filter element may comprise a support structure. The support structure may be located within the filter element. In some embodiments the support structure may be formed from a metal or a metal alloy. The support structure may for example be formed from steel. In particular, the support structure may be formed from stainless steel or coated mild steel. Support structures formed from stainless steel are particularly advantageous since they exhibit good corrosion resistance to high temperature gas contaminants that may chemically corrode the support structure.

The support structure may extend along the length of the filter element. This has the advantage that improvements in lateral strength are obtained along the length of the filter and not just along part of its length.

The support structure may comprise a cage member. The cage member may extend at least partly along the length of the filter element. In some embodiments the cage member may extend substantially along the length of the filter element. The cage member may be located at least in an upper region of the filter element. This is preferable since this region of the filter element is most prone to fracture and failure and the cage member is able to increase the lateral strength of the filter element in this region.

The support structure may comprise an elongate member. The elongate member may be in the form of a rod, a wire or a spring. The elongate member may extend downwardly from the cage member. The elongate member may be formed integrally with the cage member or it may be attached to the bottom end of the cage member. In particular, the cage member may be located in an upper region of the filter element and the elongate member may be located in a lower region of the filter element. This arrangement has the benefit that the cage member is able to strengthen the filter element in the region where it is most susceptible to fracture, while the presence of the elongate member instead of the cage member in the lower region of the filter element reduces the overall weight of the filter element. Moreover, improvements in filtration efficiency can be obtained because, compared to the cage member, the elongate member poses less of an obstruction to the internal surface area of the filter element. Support structures that comprise a cage member and an elongate member are easier to manufacture and less expensive than cage support structures without an elongate member.

In some embodiments an upper end of the support structure comprises a metal or metal alloy flange. For example the flange may be formed from steel. In particular the flange may be formed from stainless steel or from coated mild steel. The flange may comprise venturi. The metal or metal alloy flange may be connected to an upper end of the cage member.

The support structure may extend through a sleeve. In order to minimise the restriction of air flow through the filter the sleeve may be perforated. The support structure may not be in direct contract with an inner surface of the sleeve. The sleeve may be attached to the connection member. For instance, when the connection member is formed from a metal or metal alloy, the sleeve may be welded to the connection member. The sleeve may have a length of at least 200 mm. In some embodiments the length of the perforated sleeve may be between 200 mm and 500 mm. In particular, the length of the perforated sleeve may be 200 mm, 250 mm, 300 mm, 350 mm, 400 mm, 450 mm or 500 mm. The sleeve can be provided to reinforce the connection between the first and second elongate hollow bodies.

In one embodiment of the invention the upper end of the first elongate hollow body comprises a ceramic flange. When the filter element is formed from a ceramic or ceramic based material, the ceramic flange may be integral with the ceramic first elongate hollow body. The ceramic flange may be provided with a metal plate for strengthening and protecting the ceramic flange during use. The metal plate may cover all or part of an outer surface of the ceramic flange.

The lower end of the second elongate hollow body may be closed. In particular, an end cap may be used to close the lower end of the second elongate hollow body. The end cap may comprise a perimeter wall that is configured to extend into the lower wall of the second elongate hollow body. The end cap may be formed from a metal or a metal alloy. The end cap may be formed from steel for example. In particular the end cap may be formed from stainless steel or from coated mild steel.

In some embodiments the filter element may be configured to allow for expansion and contraction of the filter element in the longitudinal direction. This may be necessary for example as the filter element expands or contracts in response to changes in temperature. The filter element may comprise an end cap adjustment system. In particular, the filter element may comprise an end cap adjustment system for adjusting the longitudinal position of the end cap. The end cap adjustment system may be connected to or mounted within the support structure. The end cap adjustment system may comprise a threaded bolt configured to engage with the end cap. The threaded bolt may be externally accessible. The end cap may be configured to receive the threaded bolt. The end cap may be rotatably moveable along the threaded bolt. By rotating the end cap along a threaded bolt in a clockwise direction an operative is able to move the end cap upwards towards the upper end of the second elongate hollow body. This may be desirable if the filter element has contracted for example. Conversely, by rotating the end cap in an anti-clockwise direction an operative is able to move the end cap away from the lower end of the second elongate hollow body to allow for thermal expansion of the filter element.

In some embodiments the end cap adjustment system may comprise a resilient member. The resilient member may comprise a spring. During a filter operation the support structure and the filter element will expand and contract to different extents by virtue of them being formed from different materials. The resilient member takes up the differential between the support structure and the filter element. In particular, the resilient member enables the position of the end cap to be adjusted relative to the second elongate hollow body during a filter operation to ensure that contact is maintained between the end cap and the lower wall of the second elongate hollow body.

The length of the filter element may be greater than 3 metres. For instance, the filter element may be between 3 and 12 metres in length. In particular, the filter element may have a length between 3 and 6 metres. In some embodiments the length of the first and second elongate hollow bodies is substantially the same. For example, the length of the first and second elongate hollow bodies may be greater than 1.5 metres, greater than 2 metres, greater than 2.5 metres, greater than 3 metres, greater than 3.5 metres, greater than 4 metres, greater than 4.5 metres, greater than 5 metres or greater than 5.5 metres.

In one embodiment of the invention, the filter element is a two-piece filter element comprising the first and second elongate hollow bodies. In other embodiments filter element comprises three or more elongate hollow bodies. In particular, the filter element may be a three-piece filter element or a four-piece filter element.

The first and second elongate hollow bodies may be substantially tubular elongate hollow bodies. Thus, when the first and second elongate hollow bodies are substantially tubular, the connection member may also have a substantially tubular profile. Similarly, the support structure, and in particular the cage member of the support structure may have a substantially tubular profile. In this context the cage member may comprise a plurality of longitudinal bars and two or more ring members spaced along the longitudinal bars.

In some embodiments, one or more intermediate elongate hollow bodies may be provided between the first elongate hollow body and second elongate hollow body to increase the length of the modular filter element. The intermediate elongate hollow bodies may be open at their respective ends and joined together using the connection member in the same way as described above. Similarly, the connection member can be used to join an intermediate elongate body to the first elongate hollow body and/or to the second elongate hollow body. The upper and lower ends of the intermediate hollow bodies may be flangeless.

The filter element may be a filter candle.

According to a second aspect of the invention there is provided a method for forming a filter element, the method comprising the steps of:
- providing a first elongate hollow body having an upper wall and a lower wall;
- providing a second elongate hollow body having an upper wall and a lower wall;
- inserting a connection member into the lower wall of the first elongate hollow body and into the upper wall of the second elongate hollow body, and
- bringing the lower wall of the first elongate hollow body into contact with the upper wall of the second elongate hollow body to form a gas tight seal.

The method according to second aspect of the invention may incorporate any or all of the features described in relation to the filter element according to first aspect of the invention as desired or as appropriate.

The method may comprise the step of providing an adhesive on the lower wall of the first elongate hollow body and/or on the upper wall of the second elongate body.

According to a third aspect of the invention there is provided a support structure for a filter element, wherein the support structure comprises a cage member and an elongate member depending from the cage member.

The support structure according to the third aspect of the invention may incorporate any or all of the features described in relation to the filter element according to first aspect of the invention as desired or as appropriate.

The elongate member may be located below the cage member. In some embodiments the base of the elongate member is configured to engage with an end cap for closing the filter element. The elongate member may depend from a central region of the cage member.

The elongate member may be in the form of a rod, wire or spring. The rod may be threaded.

The cage member may comprise a flange.

According to a fourth aspect of the invention there is provided the use of the filter element according to the first aspect of the invention in a filter plant for filtering particulate matter from hot gas streams.

DETAILED DESCRIPTION OF THE INVENTION

In order that the invention may be more clearly understood one or more embodiments thereof will now be described, by way of example only, with reference to the accompanying drawings, of which:

Figure 1:
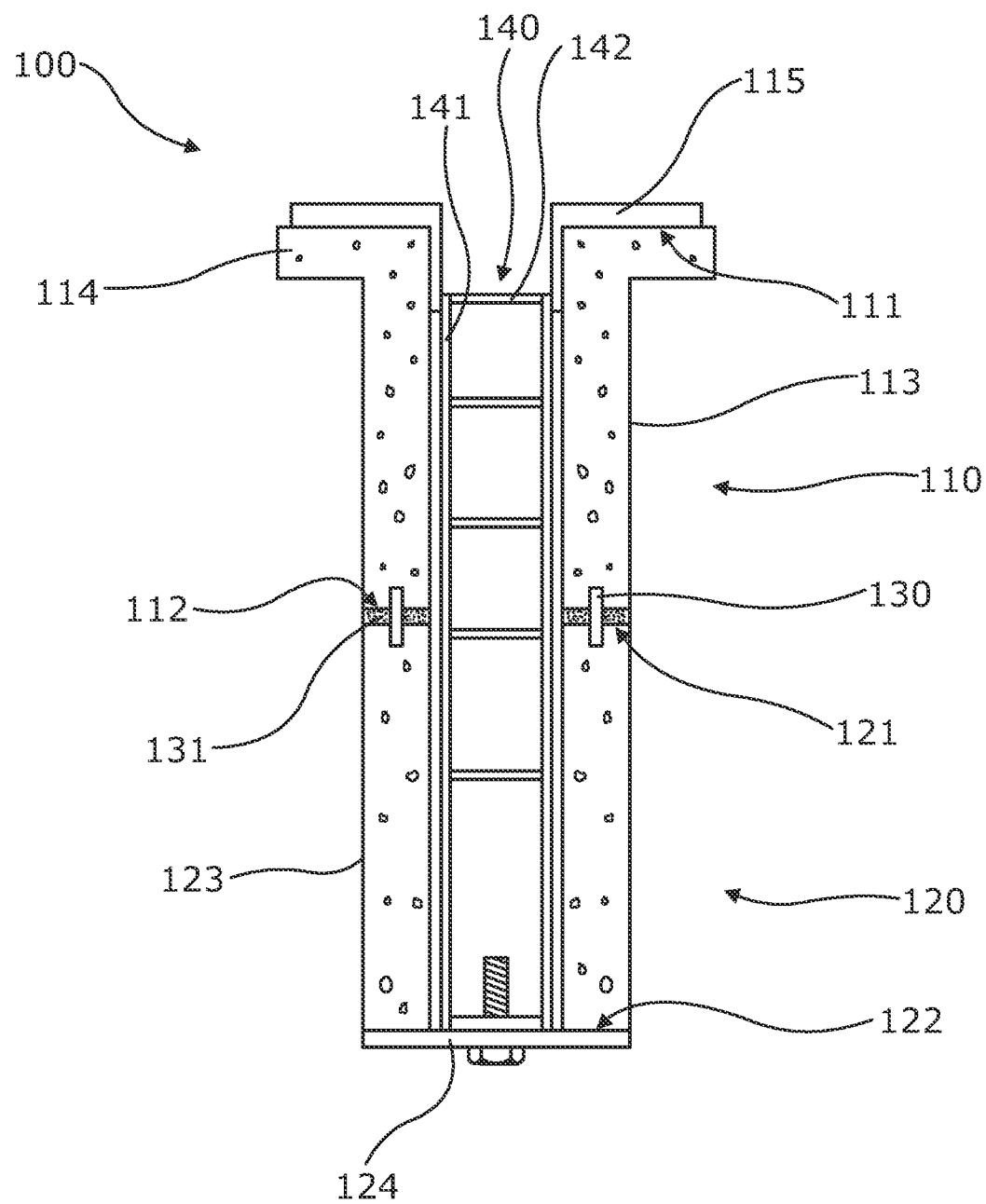
FIG. 1 shows a modular filter element in accordance with a first embodiment of the invention.

With reference to the drawings, and in accordance with an example of the present invention there is provided a ceramic filter element 100 for filtering particulate matter from hot gas streams. The modular filter element 100 comprises a first elongate hollow body 110 formed from a ceramic material having a length of about 1.8 metres and an external diameter of between 140 and 160 mm. The first elongate hollow body 110 has a substantially tubular profile that comprises an upper wall 111, a lower wall 112 and a side wall 113 that extends between the upper wall 111 and the lower wall 112. As best shown in FIG. 1, a flange 114 is located at an open upper end of the first elongate hollow body 110. The flange 114 is configured to enable mounting of the filter element 100 to a filter housing (not shown) and in this embodiment a metallic plate 115 is used to reinforce the flange 114 since this area of the filter element 100 is known to be susceptible to fracturing.

As shown in FIG. 1 the lower end of the first elongate hollow body 110 is open.

The modular filter element 100 also comprises a second elongate hollow body 120. The second elongate hollow body 120 is about 1.8 metres in length and has an external diameter of between 140 and 160 mm. Accordingly, the length: width ratio of the modular filter element 100 is greater than that shown in the drawings. The second elongate hollow body 120 is formed from a ceramic material and has a substantially tubular profile. In particular, the second elongate hollow body 120 comprises an upper wall 121, a lower wall 122 and a side wall 123 that extends between the upper wall 121 and the lower wall 122. The upper end of the second elongate hollow body 120 is open while the lower end is closed with an end cap 124, the upper edge of which cuts into the lower wall 122 of the second elongate hollow body 120.

As best shown in FIG. 1 the filter element 100 comprises a connection member 130 for forming a gas tight seal between the first elongate hollow body 110 and the second elongate hollow body 120. In particular, the connection member 130 is provided in the form of a steel seal ring that is capable of cutting into the lower wall 112 of the first elongate hollow body 110 and into the upper wall 121 of the second elongate hollow body 120. As the first and second elongate hollow bodies are brought together the seal ring 130 is pushed into and along the side wall 113 of the first elongate hollow body 110 and into and along the side wall 123 of the second elongate hollow member 120 to form the gas tight seal. A ceramic based adhesive 131 is provided at the interface between the first elongate hollow body 110 and the second elongate hollow body 120 in order to reinforce the seal ring 130 and to contribute to strengthening the connection between the first elongate hollow body 110 and the second elongate hollow body 120.

In this embodiment a tubular steel cage 140 extends centrally through and substantially along the length of the filter element 100. The cage 140 comprises a plurality of longitudinal bars 141 and ring members 142 that are spaced apart along the longitudinal bars 141. As best shown in FIG. 1 a lower part of the metal plate 115 is welded to an upper region of the cage 140 in order to secure the cage 140 in place within the filter element 100.

Figure 4:
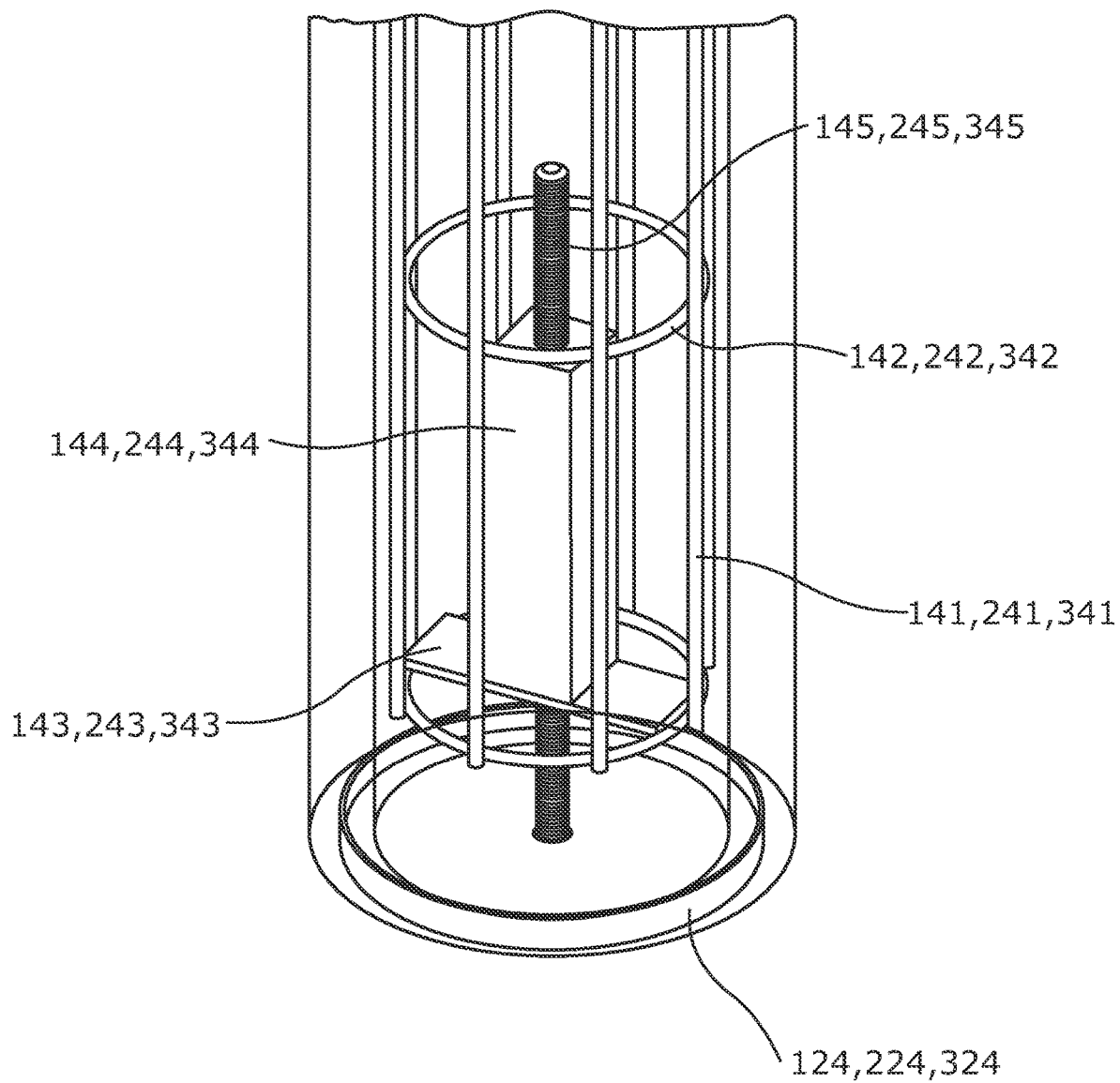
FIG. 4 shows a support structure comprising an end cap adjustment system.

As best shown in FIG. 4, a rectangular steel plate 143 spans the lowermost ring member 142 and is part of an assembly for securing the end cap 124 to the filter element 100 and for adjusting its position. In particular, the plate 143 and an elongate block 144 that extends upwardly from the plate 143 comprise threaded apertures that enable a bolt 145 to be secured to the cage 140. As best shown in FIG. 4, the threaded bolt passes through the end cap 124, the plate 143 and the block 144, and by rotating the end cap 124 in a clockwise or anti-clockwise direction, the location of the end cap 124 can be adjusted with respect to the lower end of the second elongate hollow body 120 to account for longitudinal expansion of the filter element when filtering hot gas streams.

Figure 2:
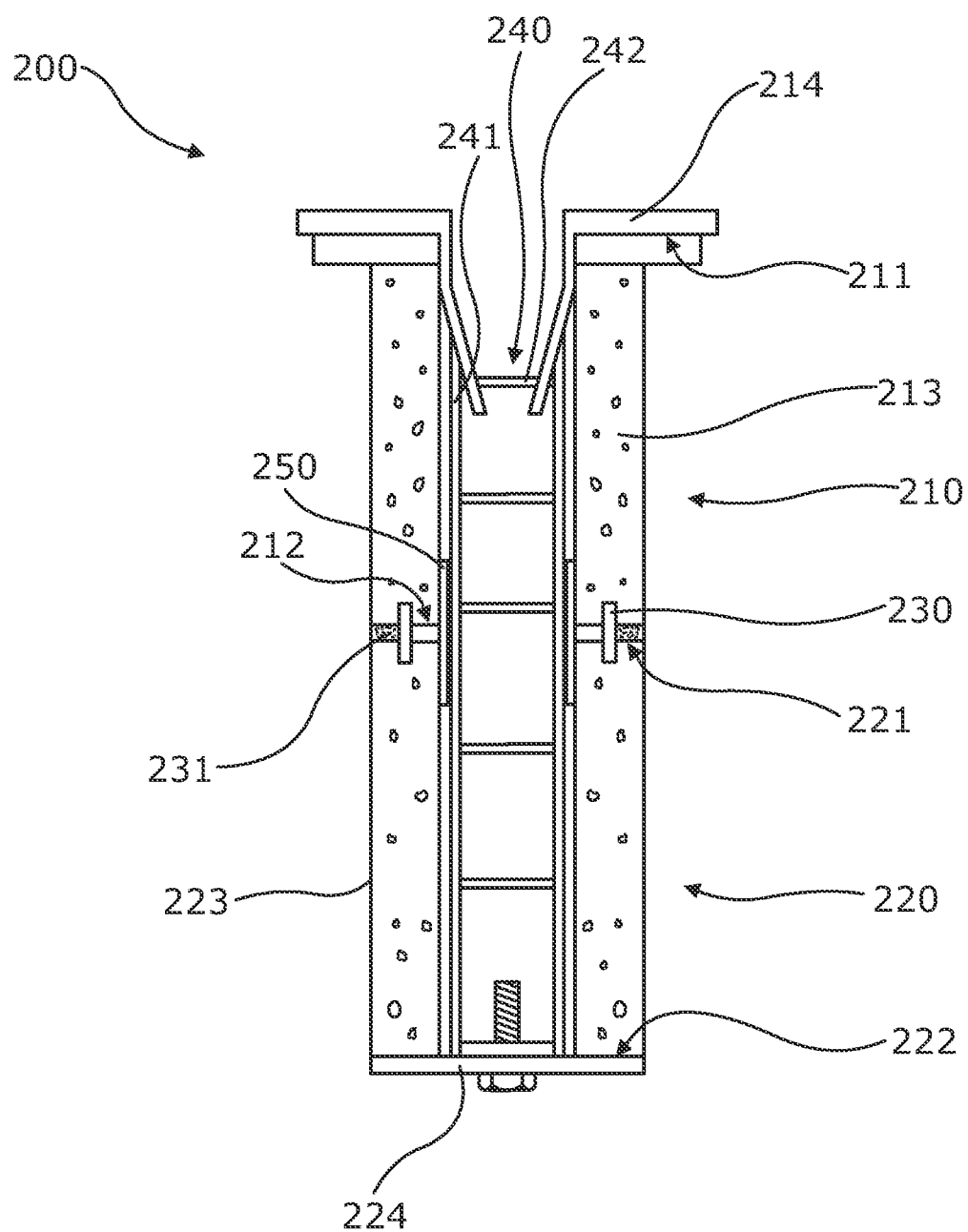
FIG. 2 shows a modular filter element in accordance with a second embodiment of the invention.
Figure 5:
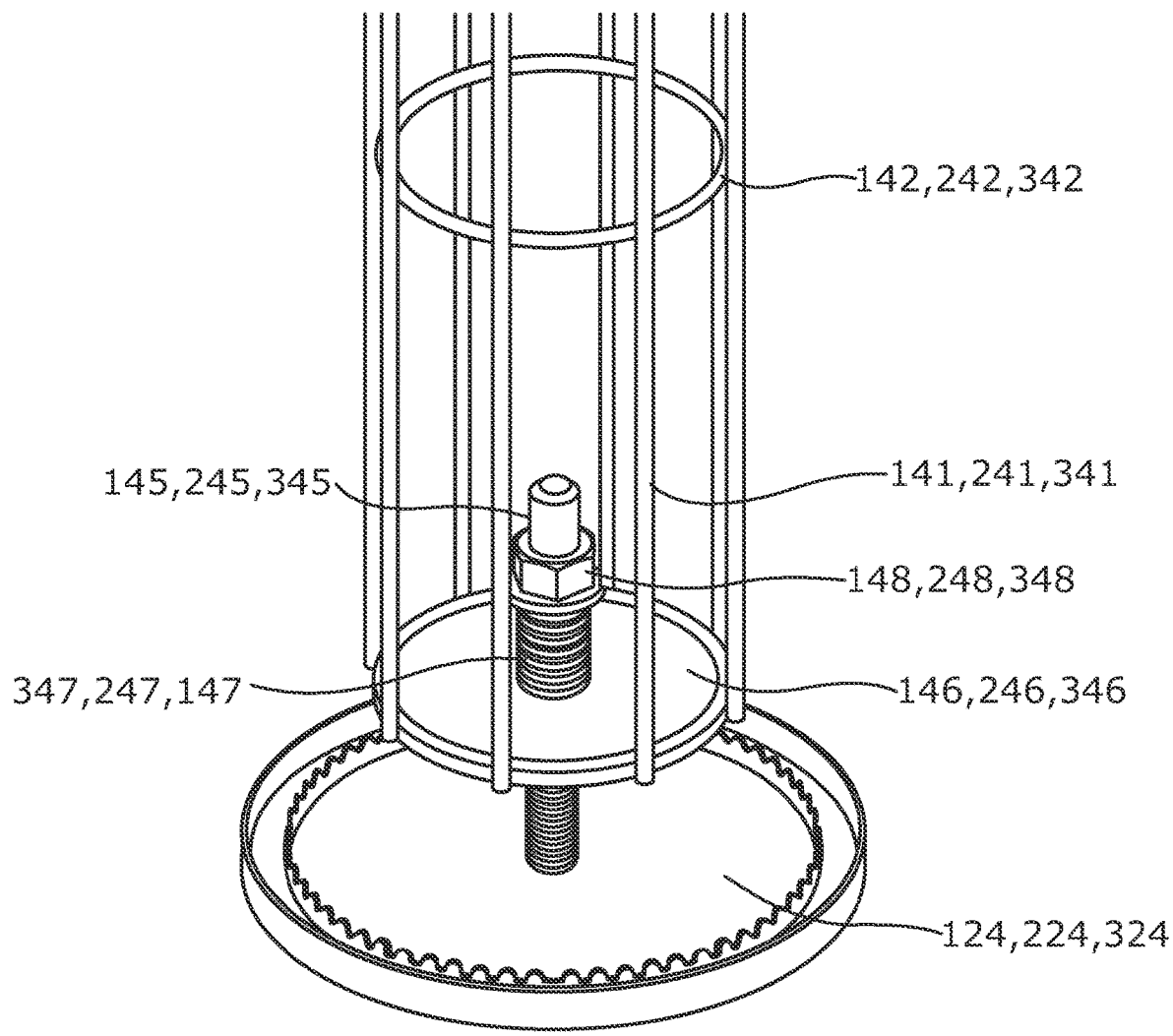
FIG. 5 shows a support structure comprising a sprung end cap adjustment system.

As best shown in FIG. 5, the end cap 124 may be sprung. In this embodiment the lower end of the cage 140 is closed using a circular plate 146. The circular plate 146 comprises an opening and the bolt 145 extends through the opening into the interior of the hollow cage 140. A spring 147 extends along the bolt 145 between the circular plate 146 and a retaining nut 148 which secures the spring 147 on the bolt 145. This arrangement allows the end cap 124 to maintain contact with the lower wall 122 of the second elongate hollow body 120 during a filter operation despite the steel cage 140 and the ceramic filter element 100 expanding and contracting in the longitudinal direction to different extents in use According to a second example of the invention, and as best shown in FIG. 2, there is provided ceramic filter element 200 for filtering particulate matter from hot gas streams. The modular filter element 200 comprises a first elongate hollow body 210 formed from a ceramic material. The first elongate hollow body 210 has a substantially tubular profile that comprises an upper wall 211, a lower wall 212 and a side wall 213 that extends between the upper wall 211 and the lower wall 212. The first elongate hollow body 210 in this example does not comprise an integral ceramic flange and is open at both ends. The first elongate hollow body 210 is about 2.8 metres in length and has an external diameter of 140 to 160 mm.

The modular filter element 200 also comprises a second elongate hollow body 220. The length and width of the second elongate hollow body 220 is about 2.8 metres and 140 to 160 mm respectively. As such, the length: width ratio of the modular filter element 200 is greater than that shown in the drawings.

The second elongate hollow body 220 is formed from a ceramic material and has a substantially tubular profile. In particular, the second elongate hollow body 220 comprises an upper wall 221, a lower wall 222 and a side wall 223 that extends between the upper wall 221 and the lower wall 222. The upper end of the second elongate hollow body 220 is open while the lower end is closed with an end cap 224, the upper edge of which cuts into the lower wall 222 of the second elongate hollow body 220.

The first and second elongate hollow bodies 210, 220 are joined together by a connection member 230. The connection member is in the form of a steel seal ring 230 which either cuts into the lower wall 212 of the first elongate hollow member 210 or is inserted into a groove or recess (not shown) formed in the upper wall 212. Similarly, the seal ring 230 can either cut into the upper wall 221 of the second elongate hollow body 220 or be inserted into a recess or groove formed in the upper wall 221.

As the first and second elongate hollow bodies 210, 220 are brought together the steel ring is pushed into and along the side wall 213 of the first elongate hollow body 210 and into and along the side wall 223 of the second elongate hollow member 220 to form the gas tight seal. In order to reinforce the steel ring and to strengthen the connection between the first elongate hollow body 210 and the second elongate hollow body 220, a ceramic based adhesive 231 can be provided at the interface between the first elongate hollow body 210 and the second elongate hollow body 220 and/or, in the grooves or recesses formed in the lower wall 212 and/or upper wall 221 of the first and second elongate hollow bodies 210, 220 respectively.

The filter element 200 also comprises a steel sleeve 250 having an outer diameter of about 107 mm and a length of approximately 400 mm. The sleeve 250 is located at the joint between the first elongate hollow body 210 and the second elongate hollow body 220 and is used for strengthening the connection between the elongate hollow bodies 210, 220. The sleeve 250 is welded to the steel seal ring 230. In this embodiment a tubular steel cage 240 extends centrally through the sleeve 250 and substantially along the length of the filter element 200. The cage 240 does not contact the interior surface of the sleeve.

As shown in FIG. 2, the cage 240 comprises a plurality of longitudinal bars 241 and ring members 242 that are spaced apart along the longitudinal bars 241. Since the first elongate hollow body 210 does not comprise a ceramic flange, a steel flange 214 is welded to an upper region of the cage 241 for securing the filter element 200 to the filter housing. The steel flange 214 comprises integrated venturi (not shown).

As best shown in FIG. 4, a rectangular steel plate 243 spans the lowermost ring member 242 of the cage 240. The plate 243 is part of an assembly for securing the end cap 224 to the filter element 200 and for adjusting its position relative to filter element 200. Specifically, the plate 243 and an elongate block 244 that extends upwardly from the plate 243 comprise threaded apertures that enable a bolt 245 to be secured to the cage 240. As best shown in FIG. 4, the threaded bolt 245 passes through the end cap 224, the plate 243 and the block 244, and by rotating the end cap 224 in a clockwise or anti-clockwise direction, the location of the end cap 224 can be adjusted with respect to the lower end of the second elongate hollow body 220 to account for longitudinal expansion of the filter element when filtering hot gas streams.

Figure 3:
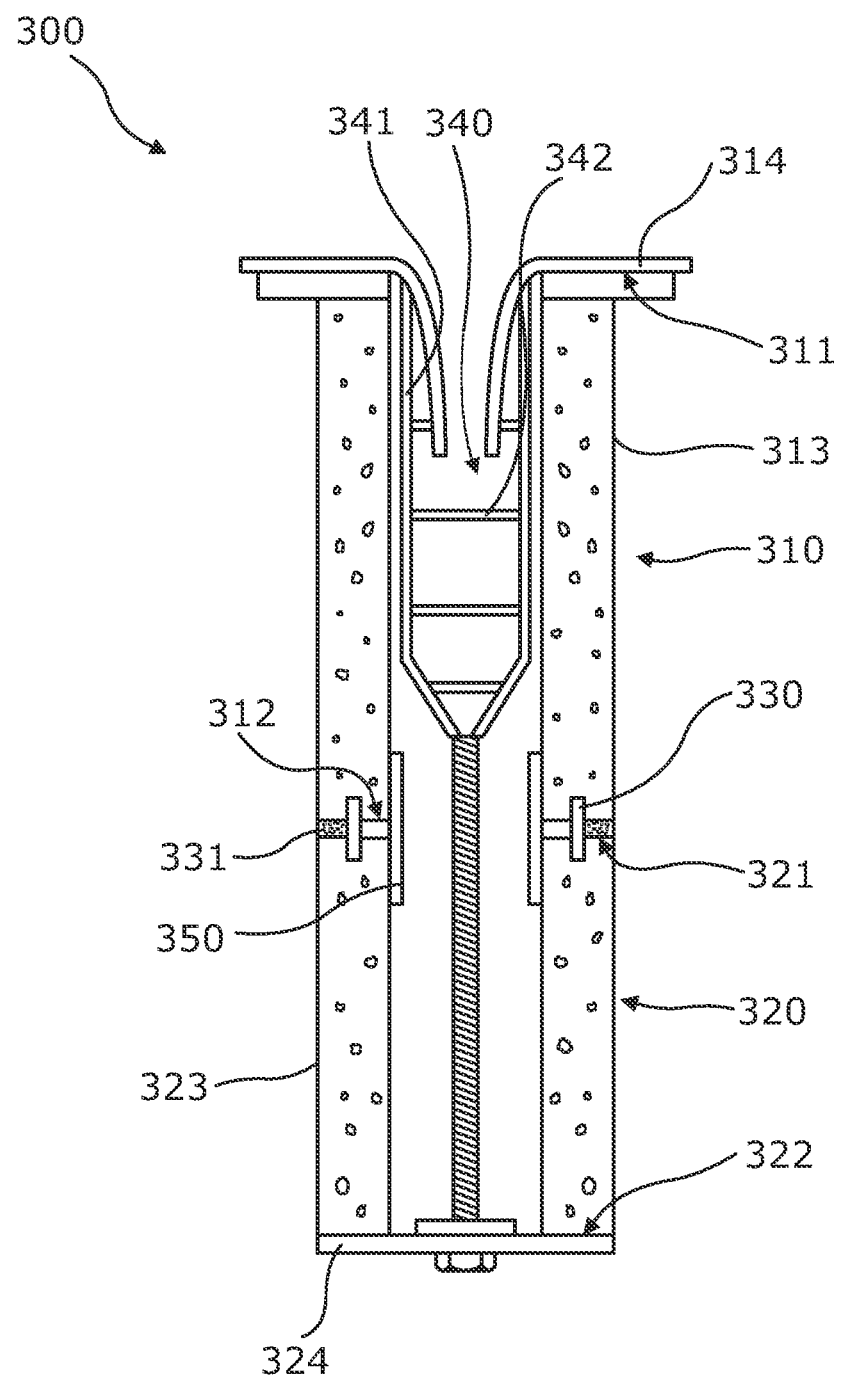
FIG. 3 shows a modular filter element in accordance with a third embodiment of the invention.

As best shown in FIG. 5, the end cap 224 may be sprung. In this embodiment the lower end of the cage 240 is closed using a circular plate 246. The circular plate 246 comprises an opening and the bolt 245 extends through the opening into the interior of the hollow cage 240. A spring 247 extends along the bolt 245 between the circular plate 146 and a retaining nut 248 which secures the spring 247 on the bolt 245. This arrangement allows the end cap 224 to maintain contact with the lower wall 222 of the second elongate hollow body 220 during a filter operation despite the steel cage 240 and the ceramic filter element 200 expanding and contracting in the longitudinal direction to different extents in use According to a third example of the invention, and as best shown in FIG. 3, there is provided a ceramic filter element 300 that is suitable for filtering particulate matter from hot gas streams. The modular filter element 300 comprises a first elongate hollow body 310 formed from a ceramic material. The first elongate hollow body 310 has a substantially tubular profile that comprises an upper wall 311, a lower wall 312 and a side wall 313 that extends between the upper wall 311 and the lower wall 312. The length of first elongate hollow body 310 is about 2.8 metres while its external diameter is 140 to 160 mm.

The modular filter element 300 also comprises a second elongate hollow body 320 having a length of about 2.8 metres and an external diameter of 140 to 160 mm. Thus, the length: width ratio of the modular filter element 300 is greater than that shown in the drawings. The second elongate hollow body 320 is formed from a ceramic material and comprises an upper wall 321, a lower wall 322 and a side wall 323 that extends between the upper wall 321 and the lower wall 322. The upper end of the second elongate hollow body 320 is open while the lower end is closed with an end cap 324. The end cap 324 is in the form of a disc with a perimeter wall, the upper edge of which is configured to cut into the lower wall 322 of the second elongate hollow body 320.

A connection member 330 in the form of a steel seal ring is used to join the first and second first and second elongate hollow bodies 310, 320. The seal ring 230 either cuts into the lower wall 312 of the first elongate hollow member 310 or is inserted into a groove or recess (not shown) formed in the upper wall 312. Similarly, the seal ring 330 either cuts into the upper wall 321 of the second elongate hollow body 320 or can be inserted into a recess or groove formed in the upperwall 321.

As the first and second elongate hollow bodies 310, 320 are brought together the seal ring 330 is pushed into and along the side wall 313 of the first elongate hollow body 310 and into and along the side wall 323 of the second elongate hollow member 320 to form the gas tight seal. In order to reinforce the steel ring and to strengthen the connection between the first and second elongate hollow bodies 310, 320, a ceramic based adhesive 331 is provided at the interface between the first and second elongate hollow bodies 310, 320 and/or in the grooves or recesses formed in the lower wall 312 and/or upper wall 321 of the first and second elongate hollow bodies 310, 320 respectively.

The filter element 300 also comprises a steel sleeve 350 having an outer diameter of about 107 mm and a length of approximately 400 mm. The sleeve 350 is located at the joint between the first elongate hollow body 310 and the second elongate hollow body 320 and is used for strengthening the connection between the elongate hollow bodies 310, 320. The sleeve 350 is welded to the steel seal ring 330.

In this embodiment a tubular steel cage 340 extends from an upper region of the first elongate hollow body 310 towards the end cap 324. The cage 340 comprises a plurality of longitudinal bars 341 and ring members 342 that are spaced apart along the longitudinal bars 341. As shown in FIG. 3 the first elongate hollow body does not comprise an integral ceramic flange and therefore a steel flange 314 is welded to an upper region of the cage 340 for securing the filter element 300 to the filter housing. The steel flange 314 comprises integrated venturi (not shown).

In this embodiment, rather than extending the length of filter element 300 as in the second example (FIG. 2), the cage 340 terminates at a location above the sleeve 350. As best shown in FIG. 3 the longitudinal bars 341 of the cage taper inwards towards the centre of the cage 340 and a single longitudinal rod 345 extends downwardly from the point where the longitudinal bars 341 converge. The rod 345 extends centrally through the sleeve 350 and beyond the lower wall 322 of the second elongate body 320. The length of the cage is about 900 mm while the length of the rod 345 is about 480 mm. The rod 345 is threaded and such an arrangement means that the end cap 324 can be secured to the rod 345 and its position can also be adjusted by rotating the end cap 324 in a clockwise or anti-clockwise direction along rod 345. In some embodiments the rod 345 may be replaced by wire or by a resilient element such as a spring. In another embodiment the end cap 324 may be sprung, in which case the lower end of the cage 340 is closed using a circular plate 346. The circular plate 346 comprises an opening and the rod 345 extends through the opening into the interior of the hollow cage 340. A spring 347 extends along the rod 345 between the circular plate 346 and a retaining nut 348 which secures the spring 347 in position on the rod 345. This arrangement allows the end cap 324 to maintain contact with the lower wall 322 of the second elongate hollow body 320 during a filter operation despite the steel cage 340 and the ceramic filter element 100 expanding and contracting in the longitudinal direction to different extents in use.

The above embodiments are described by way of example only. Many variations are possible without departing from the scope of the invention.

The invention claimed is:

1. A modular ceramic filter element comprising a first ceramic elongate hollow body, a second ceramic elongate hollow body and a connection member, in the form of a ring, wherein the connection member is metallic and is arranged to extend axially into a lower wall of the first ceramic elongate hollow body and into an upper wall of the second ceramic elongate hollow body to provide a gas-tight seal between the first ceramic elongate hollow body and the second ceramic elongate hollow body.

2. A modular ceramic filter element according to claim 1, wherein the filter element comprises an internal support structure in the form of a cage member.

3. A modular ceramic filter element according to claim 2 wherein an elongate member depends from the cage member.

4. A modular ceramic filter element according to claim 3, wherein the cage member is located in an upper region of the ceramic filter element and the elongate member is located in a lower region of the ceramic filter element.

5. A modular ceramic filter element according to claim 3, wherein the elongate member comprises a rod, a wire or a spring.

6. A modular ceramic filter element according to claim 2, wherein the support structure extends through a sleeve.

7. A modular ceramic filter element according to claim 6, wherein the sleeve is perforated.

8. A modular ceramic filter element according to claim 6, wherein the sleeve is attached to the connection member.

9. A modular ceramic filter element according to the claim 8, wherein the sleeve is metallic and is welded to the connection member.

10. A modular ceramic filter element according to claim 1, wherein the ceramic filter element comprises an end cap, the end cap comprising a perimeter wall that is configured to extend into the lower wall of the second ceramic elongate hollow body.

11. A modular ceramic filter element according to claim 10, comprising an end cap adjustment system for adjusting the longitudinal position of the end cap relative to the ceramic filter element.

12. A modular ceramic filter element according to claim 11, wherein the end cap adjustment system comprises a threaded bolt configured to engage with the end cap.

13. A modular ceramic filter element according to claim 12, wherein the end cap is rotatably moveable along the threaded bolt.

14. A modular ceramic filter element according to claim 11, wherein the end cap adjustment system comprises a resilient member for maintaining contact between the end cap and the lower wall of the second ceramic elongate hollow body.

15. A modular ceramic filter element according to claim 14, wherein the resilient member comprises a spring.

16. A modular ceramic filter element according to claim 1, wherein the modular ceramic filter element is greater than 3 metres in length.

17. A modular ceramic filter element according to claim 1, wherein the modular ceramic filter element is a filter candle.

18. A method of forming a ceramic filter element, the method comprising the steps of:
- providing a first ceramic elongate hollow body having an upper wall and a lower wall;
- providing a second ceramic elongate hollow body having an upper wall and a lower wall;
- inserting a metallic connection member in the form of a ring, axially into the lower wall of the first ceramic elongate hollow body and into the upper wall of the second ceramic elongate hollow body, and
- bringing the lower wall of the first ceramic elongate hollow body into contact with the second ceramic elongate hollow body to form a gas tight seal.

19. A support structure for a modular ceramic filter element according to claim 2, wherein the support structure comprises a cage member and an elongate member depending from the cage member.

20. A support structure according to claim 19, wherein the base of the elongate member is configured to engage with an end cap for closing the modular ceramic filter element.

* * * * *